United States Patent
Hong et al.

(10) Patent No.: US 7,719,203 B2
(45) Date of Patent: May 18, 2010

(54) INVERTER, BACKLIGHT ASSEMBLY HAVING THE SAME AND DISPLAY APPARATUS HAVING THE SAME

(75) Inventors: Jin-Taek Hong, Incheon (KR); Song-Yi Han, Yongin-si (KR); Byung-Kyou Min, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1 day.

(21) Appl. No.: 12/047,418

(22) Filed: Mar. 13, 2008

(65) Prior Publication Data

US 2008/0238333 A1 Oct. 2, 2008

(30) Foreign Application Priority Data

Mar. 26, 2007 (KR) ........................ 10-2007-0029302

(51) Int. Cl.
*H05B 37/02* (2006.01)
(52) U.S. Cl. .................. 315/291; 315/276; 315/287; 315/307
(58) Field of Classification Search .......... 315/149, 315/209 R, 224–226, 247, 274–276, 291, 315/307–308, 312; 363/55–56, 95–98, 131
See application file for complete search history.

(56) References Cited

U.S. PATENT DOCUMENTS

| | | | | |
|---|---|---|---|---|
| 4,251,752 A | * | 2/1981 | Stolz | 315/206 |
| 4,719,390 A | * | 1/1988 | Sairanen | 315/246 |
| 5,408,203 A | * | 4/1995 | Okano et al. | 331/143 |
| 5,619,402 A | * | 4/1997 | Liu | 363/20 |
| 5,838,181 A | * | 11/1998 | Hesterman | 327/175 |
| 6,628,093 B2 | * | 9/2003 | Stevens | 315/291 |
| 2004/0066149 A1 | * | 4/2004 | Gray | 315/244 |
| 2006/0175983 A1 | * | 8/2006 | Crouse et al. | 315/291 |
| 2006/0279232 A1 | * | 12/2006 | Takahama et al. | 315/282 |
| 2007/0171684 A1 | * | 7/2007 | Fukumoto | 363/21.09 |

FOREIGN PATENT DOCUMENTS

| | | |
|---|---|---|
| JP | 2006294328 | 10/2006 |
| KR | 1020020045462 A | 6/2002 |
| KR | 1020040058627 A | 7/2004 |

* cited by examiner

*Primary Examiner*—David Hung Vu
*Assistant Examiner*—Tung X Le
(74) *Attorney, Agent, or Firm*—Cantor Colburn LLP (57) ABSTRACT

A display apparatus includes a display panel and a backlight assembly including a lamp and an inverter. The inverter includes a main transformer, a main driver and a voltage controller. The main transformer applies a driving alternating current (AC) voltage to the lamp. The main driver generates an output signal controlling the main transformer based on a feedback signal from the main transformer. The voltage controller is electrically connected to a feedback terminal of the main driver to control a maximum level of a voltage applied to the feedback terminal.

19 Claims, 7 Drawing Sheets

INVERTER, BACKLIGHT ASSEMBLY HAVING THE SAME AND DISPLAY APPARATUS HAVING THE SAME

The present application claims priority to Korean Patent Application No. 2007-29302, filed on Mar. 26, 2007, and all the benefits accruing therefrom under 35 U.S.C. §119, the contents of which are herein incorporated by reference in their entirety.

BACKGROUND OF THE INVENTION

1. Field of the Invention

The present invention relates to an inverter, a backlight assembly having the inverter and a display apparatus having the inverter. More particularly, the present invention relates to an inverter used for a display apparatus, a backlight assembly having the inverter and a display apparatus having the inverter.

2. Description of the Related Art

A liquid crystal display ("LCD") apparatus has various characteristics such as light weight, low power consumption and low driving voltage. Thus, the LCD apparatus has been used in various fields, such as in, monitors, notebook computers, mobile phones and large television receiver sets. The LCD apparatus includes an LCD panel displaying images by using optical transmittance of liquid crystals and a backlight assembly disposed under the LCD panel to provide the LCD panel with light.

The backlight assembly includes lamps disposed substantially parallel with each other and an inverter applying driving power to the lamps. The lamps may include cold cathode fluorescent lamps ("CCFLs") having a rod shape.

The CCFLs require excessive power to generate light during an initial driving period. That is, the inverter applies the excessive power to the CCFLs during the initial driving period. The CCFLs consume more power during the initial driving period than a normal driving period. The initial driving period is usually called a power overshoot period.

As a result, the power consumption of the initial driving period is excessively higher than that of the normal driving period, so that the amount of the power applied to the lamps using the inverter is restricted.

BRIEF SUMMARY OF THE INVENTION

An exemplary embodiment provides an inverter capable of essentially preventing a power overshoot in an initial driving period.

An exemplary embodiment provides a backlight assembly having the above-mentioned inverter.

An exemplary embodiment provides a display apparatus having the above-mentioned backlight assembly.

In an exemplary embodiment, an inverter includes a main transformer, a main driver and a voltage controller.

The main transformer applies a driving alternating current (AC) voltage to a lamp. The main driver generates an output signal to control the main transformer based on a feedback signal from the main transformer. The voltage controller is electrically connected to a feedback terminal of the main driver to control a maximum level of a voltage applied to the feedback terminal. The voltage controller may include a Zener diode which controls the maximum level of the voltage applied to the feedback terminal.

In an exemplary embodiment, the main driver may include a shutdown circuit which shuts down the main driver when the voltage applied to the feedback terminal exceeds a critical voltage. The maximum level of the voltage applied to the feedback terminal may be equal to or smaller than the critical voltage.

In an exemplary embodiment, a maximum duty width of the output signal corresponding to the critical voltage may have a range from about 44% to about 46%.

In an exemplary embodiment, a backlight assembly includes a lamp and an inverter. The inverter includes a main transformer, a main driver and a voltage controller.

The lamp generates light. The main transformer applies a driving AC voltage to the lamp. The main driver generates an output signal to control the main transformer based on a feedback signal from the main transformer. The voltage controller is electrically connected to a feedback terminal of the main driver to control a maximum level of a voltage applied to the feedback terminal.

In an exemplary embodiment, a first end of the lamp may receive the driving AC voltage and a second end of the lamp may receive a ground voltage.

In an exemplary embodiment, a display apparatus includes a display panel and a backlight assembly.

The display panel displays images. The backlight assembly includes a lamp and an inverter. The inverter includes a main transformer applying a driving AC voltage to the lamp, a main driver generating an output signal to control the main transformer based on a feedback signal from the main transformer, and a voltage controller electrically connected to a feedback terminal of the main driver to control a maximum level of a voltage applied to the feedback terminal.

In an exemplary embodiment, a voltage controller is electrically connected to a feedback terminal of a main driver to control a maximum level of the voltage applied to the feedback terminal. Advantageously, a power overshoot that occurs when the lamp is initially driven may be reduced or effectively prevented.

BRIEF DESCRIPTION OF THE DRAWINGS

The above and other advantages of the present invention will become more apparent by describing in detail example embodiments thereof with reference to the accompanying drawings, in which.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "under" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" other elements or features would then be oriented "above" the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
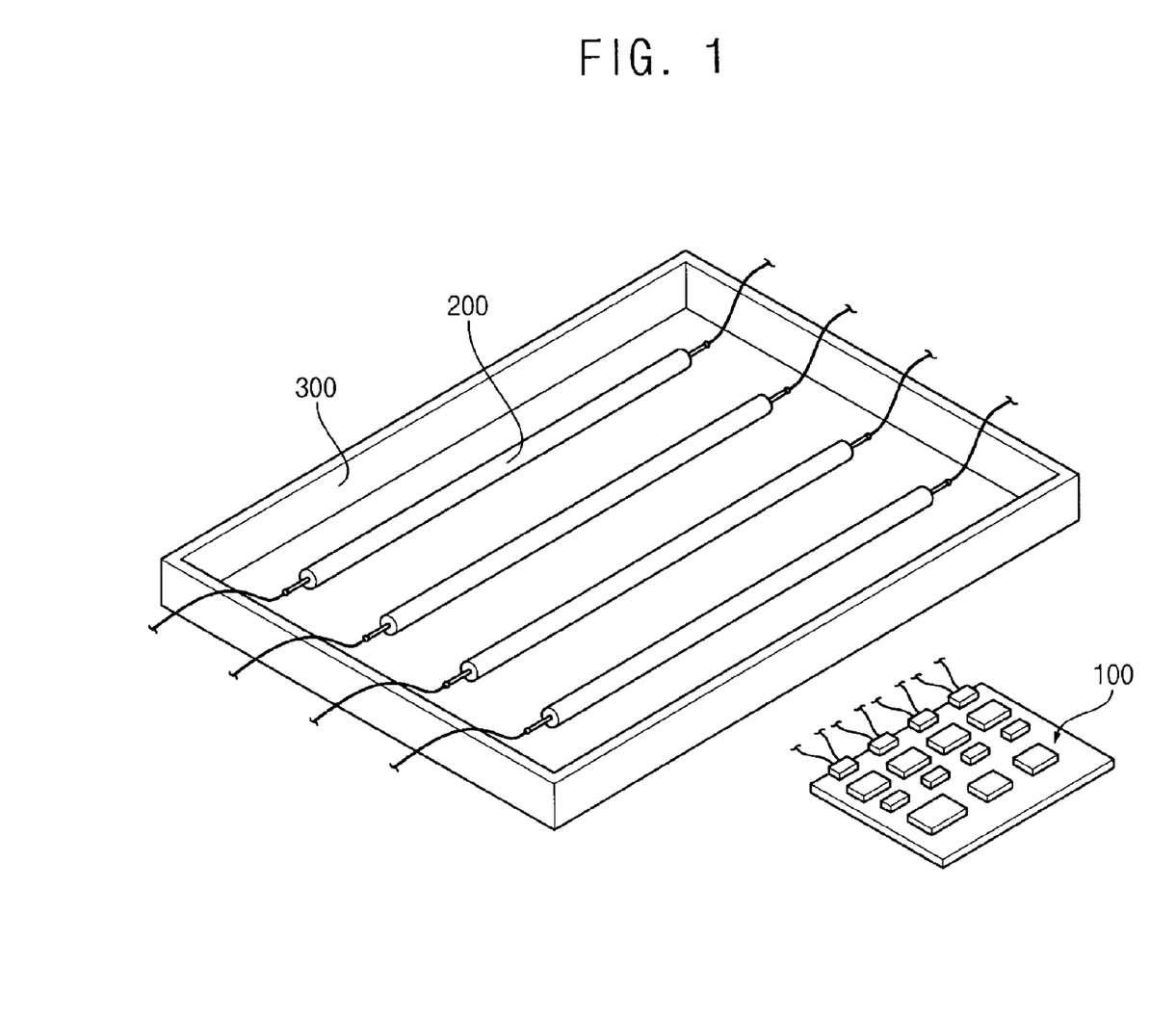
FIG. 1 is a perspective view illustrating an exemplary embodiment of a backlight assembly in accordance with the present invention.

FIG. 1 is a perspective view illustrating an exemplary embodiment of a backlight assembly in accordance with the present invention.

Referring to FIG. 1, a backlight assembly includes an inverter 100, a plurality of lamps 200 and a receiving container 300.

The inverter 100 is electrically connected to the lamps 200 and applies a driving alternating current (AC) voltage to the lamps 200.

The lamps 200 are disposed substantially parallel with each other in the receiving container 300, extend in a longitudinal direction of the receiving container 300, and are arranged in a transverse direction of the receiving container. In an exemplary embodiment, each of the lamps 200 may be a cold cathode fluorescent lamp ("CCFL"), and may have a substantially rod shape or a U-shape. As illustrated in FIG. 1, each of the lamps 200 may include the CCFL having the rod shape. Opposite ends of each of the lamps 200 are electrically connected to the inverter 100 using electric wires.

The receiving container 300 includes a bottom plate and a side wall formed on an edge of the bottom plate to form a receiving space. The receiving container 300 receives the lamp 200 in the receiving space. The inverter 100 may be disposed on an outside of the receiving container 300, such as an outer surface of the bottom plate.

Figure 2:
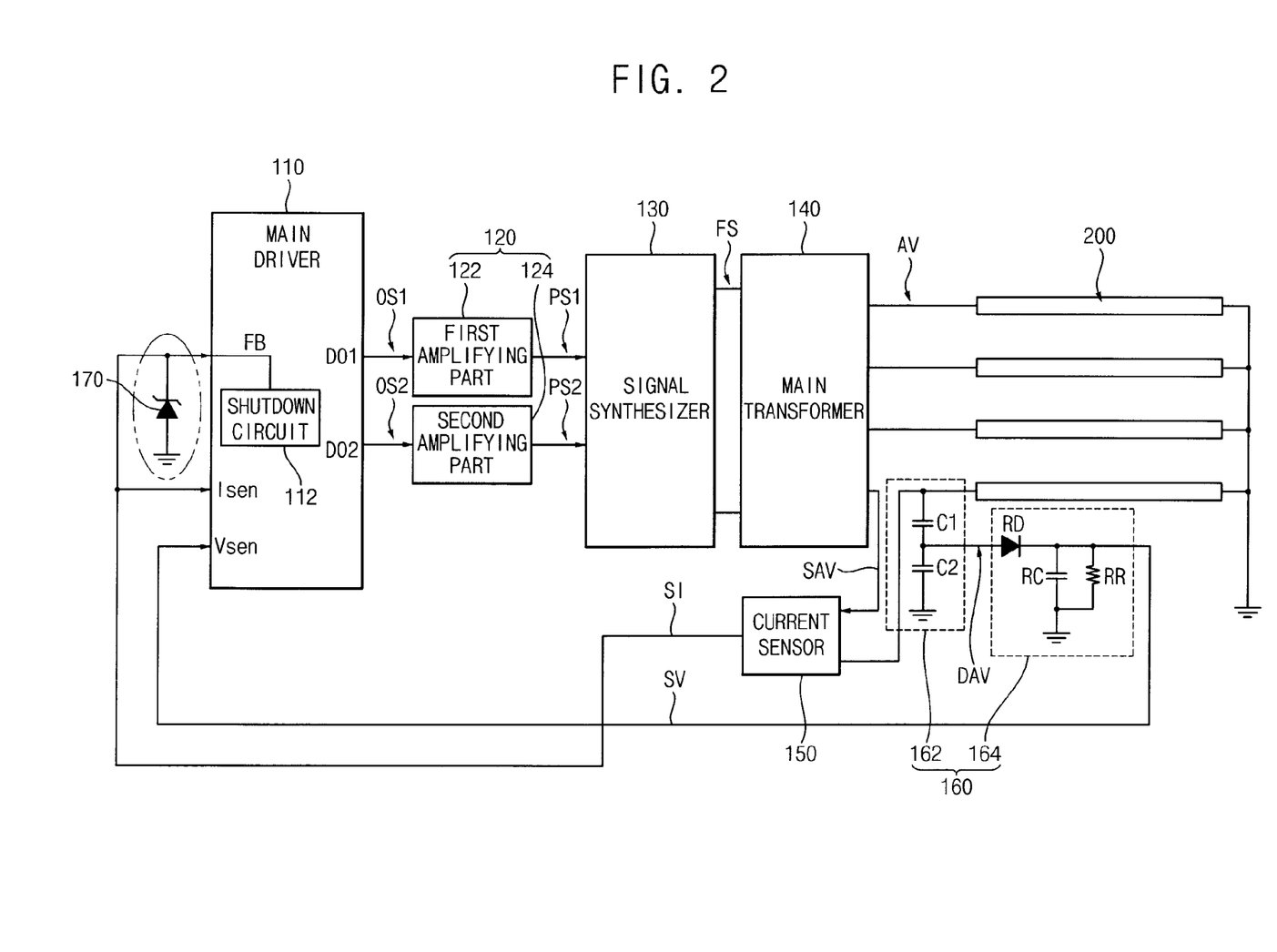
FIG. 2 is a block diagram illustrating an exemplary embodiment of electrical connection relationships among elements of the backlight assembly shown in FIG. 1.

FIG. 2 is a block diagram illustrating an exemplary embodiment of electrical connection relationships among elements of the backlight assembly shown in FIG. 1.

Referring to FIGS. 1 and 2, the inverter 100 includes a main driver 110, a signal amplifier 120, a signal synthesizer 130, a main transformer 140, a current sensor 150, a voltage sensor 160 and a voltage controller 170.

The main driver 110 receives a feedback signal from the main transformer 140, and controls the main transformer 140 in response to the feedback signal. A terminal of the main driver 110 includes an output terminal, a voltage sensing terminal Vsen, a current sensing terminal Isen and a feedback terminal FB. In an exemplary embodiment, the main driver 110 may include a shutdown circuit 112 electrically connected to the feedback terminal FB.

The output terminal of the main driver 110 is electrically connected to the signal amplifier 120, and includes a first output terminal DO1 and a second output terminal DO2. The first output terminal DO1 outputs a first output signal OS1 and the second output terminal DO2 outputs a second output signal OS2. In exemplary embodiments, the first and second output signals OS1 and OS2 may be square wave signals.

The voltage sensing terminal Vsen of the main driver 110 is electrically connected to the voltage sensor 160 and receives a sensing voltage SV from the voltage sensor 160. The current sensing terminal Isen of the main driver 110 is electrically connected to the current sensor 150 and receives a sensing current SI from the current sensor 150.

The feedback terminal FB of the main driver 110 is electrically connected to the current sensor 150 and the voltage controller 170. The feedback terminal FB receives the sensing current SI from the current sensor 150. A maximum level of the sensing current SI applied to the feedback terminal FB is controlled by the voltage controller 170.

The shutdown circuit 112 of the main driver 110 may shut down the main driver 112 when the maximum level of the sensing current SI applied to the feedback terminal FB exceeds a critical voltage. The maximum level of the sensing current SI applied to the feedback terminal FB may be controlled by the voltage controller 170 to be smaller than or equal to the critical voltage.

The critical voltage applied to the feedback terminal FB corresponds to a maximum duty width of the first and second output signals OS1 and OS2. When the critical voltage is applied to the feedback terminal FB, the maximum duty width of the first and second output signals OS1 and OS2 has a range from about 44% to about 46%. In one exemplary embodiment, the maximum duty width of the first and second output signals OS1 and OS2 may be about 45%.

The signal amplifier 120 includes a first amplifying part 122 and a second amplifying part 124. The first amplifying part 122 receives the first output signal OS1 from the first output terminal DO1, and a second amplifying part 124 receives the second output signal OS2 from the second output terminal DO2.

The first amplifying part 122 amplifies the first output signal OS1 to generate a first amplified signal PS1, and applies the first amplified signal PS1 to the signal synthesizer 130. The second amplifying part 124 amplifies the second output signal OS2 to generate a second amplified signal PS2, and applies the second amplified signal PS2 to the signal synthesizer 130.

The first output signal OS1, the second output signal OS2, the first amplified signal PS1 and the second amplified signal PS2 may be square wave signals. In one exemplary embodiment, the square waves of the first and second output signals OS1 and OS2 may have levels in a range from about 3 volts (V) to about 5 volts (V). The square waves of the first and second amplified signals PS1 and PS2 have levels in a range from about 20 V to about 25 V, which is higher than the level of the first and second output signals OS1 and OS2.

The signal synthesizer 130 is electrically connected to the first and second amplifying parts 122 and 124 to receive the first and second amplified signals PS1 and PS2. The signal synthesizer 130 synthesizes the first and second amplified signals PS1 and PS2, and generates or composes a synthesized signal FS applied to the main transformer 140. In an exemplary embodiment, the signal synthesizer 130 may include a full bridge topology circuit.

The main transformer 140 changes the voltage level of the synthesized signal FS applied from the signal synthesizer 130 to generate the driving AC voltage AV, and applies the driving AC voltage AV to the lamps 200. In exemplary embodiments, the number of main transformers 140 may be substantially the same as the number of the lamps 200, however, the present invention is not limited thereto.

In one exemplary embodiment, a first winding coil of the main transformer 140 may be electrically connected to the signal synthesizer 130 to receive the synthesized signal FS. The main transformer 140 boosts the synthesized signal FS to output the driving AC voltage AV to a second winding coil of the main transformer 140. The second winding coil of the main transformer 140 is electrically connected to the lamps 200 to apply the driving AC voltage AV to the lamps 200. A first end of each of the lamps 200 receives the driving AC voltage AV and a second end of each of the lamps 200 receives a ground voltage.

Figure 3:
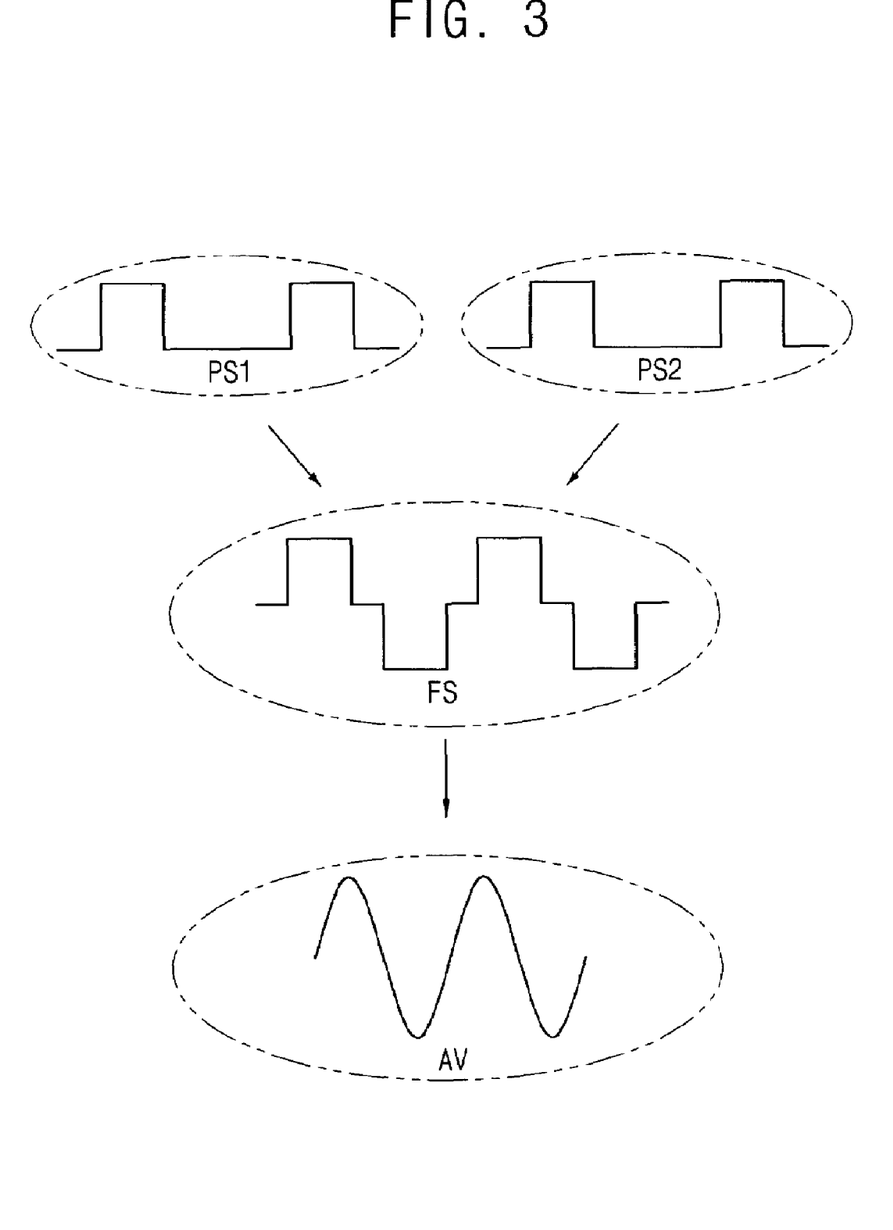
FIG. 3 is a waveform diagram illustrating an exemplary embodiment of a process of generating a driving alternating current (AC) voltage as shown in FIG. 2.

FIG. 3 is a waveform diagram illustrating an exemplary embodiment of a process of generating a driving AC voltage as shown in FIG. 2.

Referring to FIGS. 2 and 3, the first and second amplified signals PS1 and PS2 are changed into the driving AC voltage AV as follows.

The first and second amplifying parts 122 and 124 output the first and second amplified signals PS1 and PS2 to the signal synthesizer 130. The first and second amplified signals PS1 and PS2 may be square wave signals forming a phase delay. In one exemplary embodiment, the first and second amplified signals PS1 and PS2 may be square wave signals forming a phase delay of about 180 degrees.

The signal synthesizer 130 synthesizes the first and second amplified signals PS1 and PS2, and outputs the synthesized signal FS to the main transformer 140. Since the synthesized signal FS is formed by synthesizing the first and second amplified signals PS1 and PS2, the synthesized signal FS is a square wave signal having levels which are changed into a first voltage of positive polarity, a zero voltage, a second voltage of negative polarity and a zero voltage, in sequence.

In one exemplary embodiment, when the first and second amplified signals PS1 and PS2 are square wave signals forming a phase delay of about 180 degrees and have a level of about 24 V, the synthesized signal FS may be a square wave signal having levels changed into about 24 V, about 0 V, about −24 V and about 0 V, in sequence.

The main transformer 140 boosts the synthesized signal FS and outputs the driving AC voltage AV to the lamps 200. In an exemplary embodiment, the driving AC voltage AV may have levels in a range from about 1 kV to about 100 kV.

Referring again to FIG. 2, the current sensor 150 receives a sensing AC voltage SAV from the main transformer 140, and generates the sensing current SI in response to the sensing AC voltage SAV. In an exemplary embodiment, the sensing AC voltage SAV may be one of the driving AC voltages AV applied to the lamps 200.

In an exemplary embodiment, the current sensor 150 may be a sub-transformer including a first winding coil and a second winding coil. The first winding coil of the sub-transformer is electrically connected between one end of the main transformer and one end of one lamp of the lamps 200. Thus, the sensing AC voltage SAV outputted from the one end of the main transformer is applied to the one end of the one lamp through the first winding coil.

The sub-transformer generates the sensing current SI in the second winding coil of the sub-transformer in response to the sensing AC voltage SAV of the first winding coil. The second winding coil of the sub-transformer is electrically connected to the current sensing terminal Isen of the main driver 110 and the feedback terminal FB of the main driver 110, respectively. Thus, the second winding coil applies the sensing current SI to the current sensing terminal Isen and the feedback terminal FB.

The voltage sensor 160 is electrically connected to the one end of the one lamp of the lamps 200. The voltage sensor 160 applies the sensing voltage SV to the voltage sensing terminal Vsen of the main driver 110. In one exemplary embodiment, the voltage sensor 160 may include a voltage dropping circuit 162 and a rectifying circuit 164, as illustrated in FIG. 2.

The voltage dropping circuit 162 is electrically connected to the one end of the one lamp. The one lamp may be a lamp receiving the sensing AC voltage SAV from the main transformer 140. The voltage dropping circuit 162 decreases the sensing AC voltage SAV and generates a dropped (e.g., or lowered) AC voltage DAV.

The voltage dropping circuit 162 may include a first capacitor C1 and a second capacitor C2. A first end of the first capacitor C1 is electrically connected to the one end of the lamp where the sensing AC voltage SAV is applied. A second end of the first capacitor C1 is electrically connected to a first end of the second capacitor C2. A second end of the second capacitor C2 is electrically connected to a ground potential. The dropped AC voltage DAV is generated between the first and second capacitors C1 and C2. In an exemplary embodiment, levels in the dropped AC voltage DAV are determined by a ratio between capacitances of the first and second capacitors C1 and C2.

A first end of the rectifying circuit 164 is electrically connected to the voltage dropping circuit 162. A second end of the rectifying circuit 164 is electrically connected to the voltage sensing terminal Vsen of the main driver 110. The rectifying circuit 164 receives the dropped AC voltage DAV from the voltage dropping circuit 162, and rectifies the dropped AC voltage DAV to generate the sensing voltage SV as a direct current (DC) voltage.

In an exemplary embodiment, the rectifying circuit 164 may include, but is not limited to, a rectifying diode RD, a rectifying capacitor RC and a rectifying resistor RR, as illustrated in FIG. 2. A first end of the rectifying diode RD is electrically connected to an electric wire between the first and second capacitors C1 and C2. A second end of the rectifying diode RD is electrically connected to the voltage sensing terminal Vsen of the main driver 110. The rectifying capacitor RC and the rectifying resistor RR are electrically connected, in parallel, and are electrically connected to the second end of the rectifying diode RD and the ground potential.

The voltage controller 170 is electrically connected to the feedback terminal FB of the main driver 110 to control a maximum level of a voltage applied to the feedback terminal FB. The maximum level of the voltage applied to the feedback terminal FB may be substantially equal to or smaller than the critical voltage.

In exemplary embodiments, the voltage controller 170 may be a Zener diode. A voltage between first and second ends of the Zener diode remains under a predetermined voltage level. The first end of the Zener diode is electrically connected to the feedback terminal FB, and the second end of the Zener diode is electrically connected to the ground potential.

Hereinafter, effects of the illustrated embodiments will be described in detail with reference to the accompanying drawings.

Figure 4:
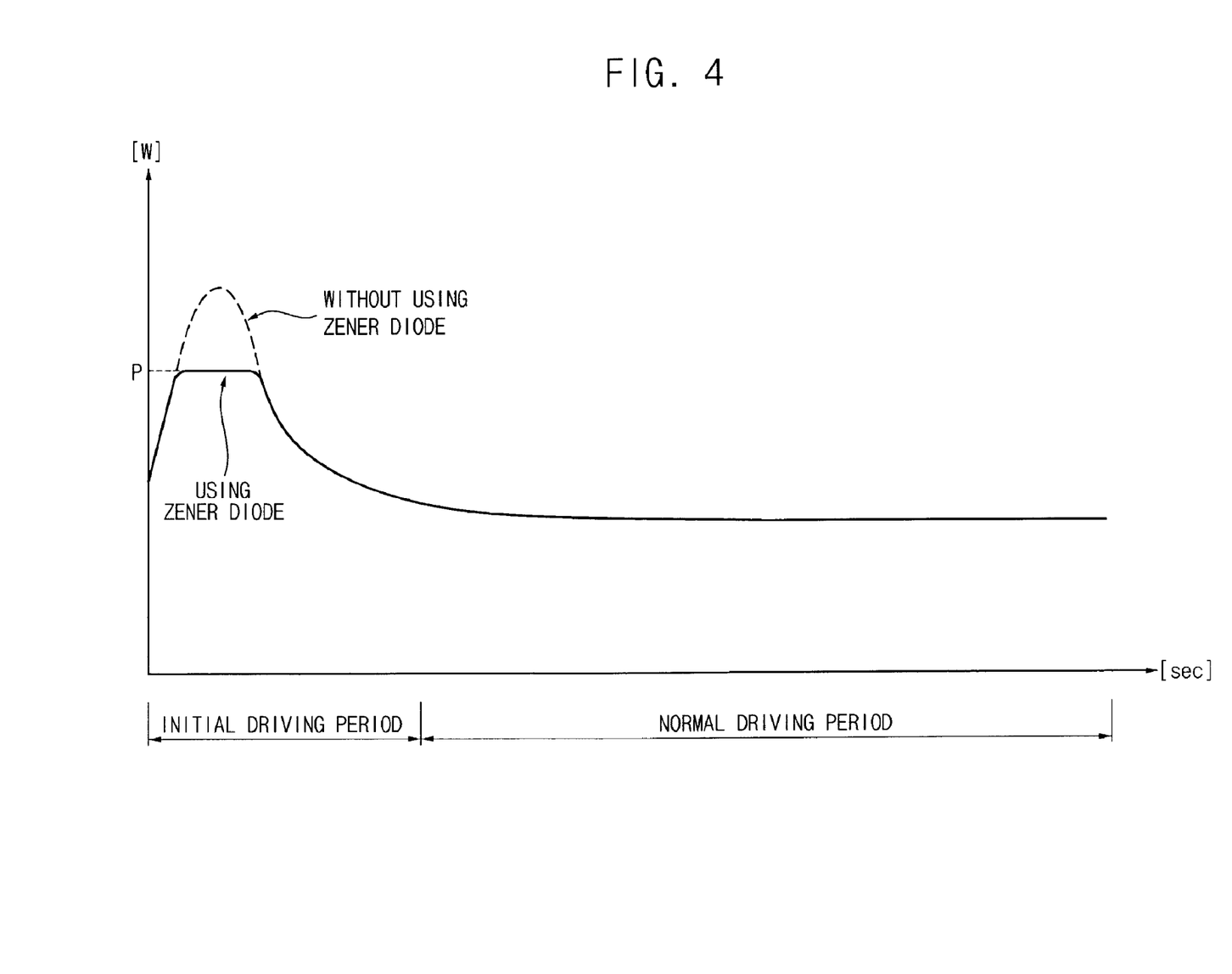
FIG. 4 is a graph illustrating an exemplary embodiment of relationships among time, power consumption of a lamp and a Zener diode shown in FIG. 2.

FIG. 4 is a graph illustrating an exemplary embodiment of relationships among time, power consumption of a lamp and a Zener diode shown in FIG. 2.

Referring to FIGS. 2 and 4, when the Zener diode is not used in the backlight assembly (e.g., portion of the curve shown in dotted lines), an initial power consumed by the lamp during an initial driving period may be increased over the critical power P (along the vertical axis of power, labeled as [W] for watts). That is, when the Zener diode is not used in the backlight assembly, a power overshoot may occur in the backlight assembly during the initial driving period (horizontal axis of time, labeled as [sec] for seconds).

When the Zener diode is used in the backlight assembly, such as in the illustrated exemplary embodiments, the initial power is increased up to the critical power P, and then is decreased below the critical power P. Advantageously, when the Zener diode is used in the backlight assembly, the power overshoot does not occur during the initial driving period.

Figure 5:
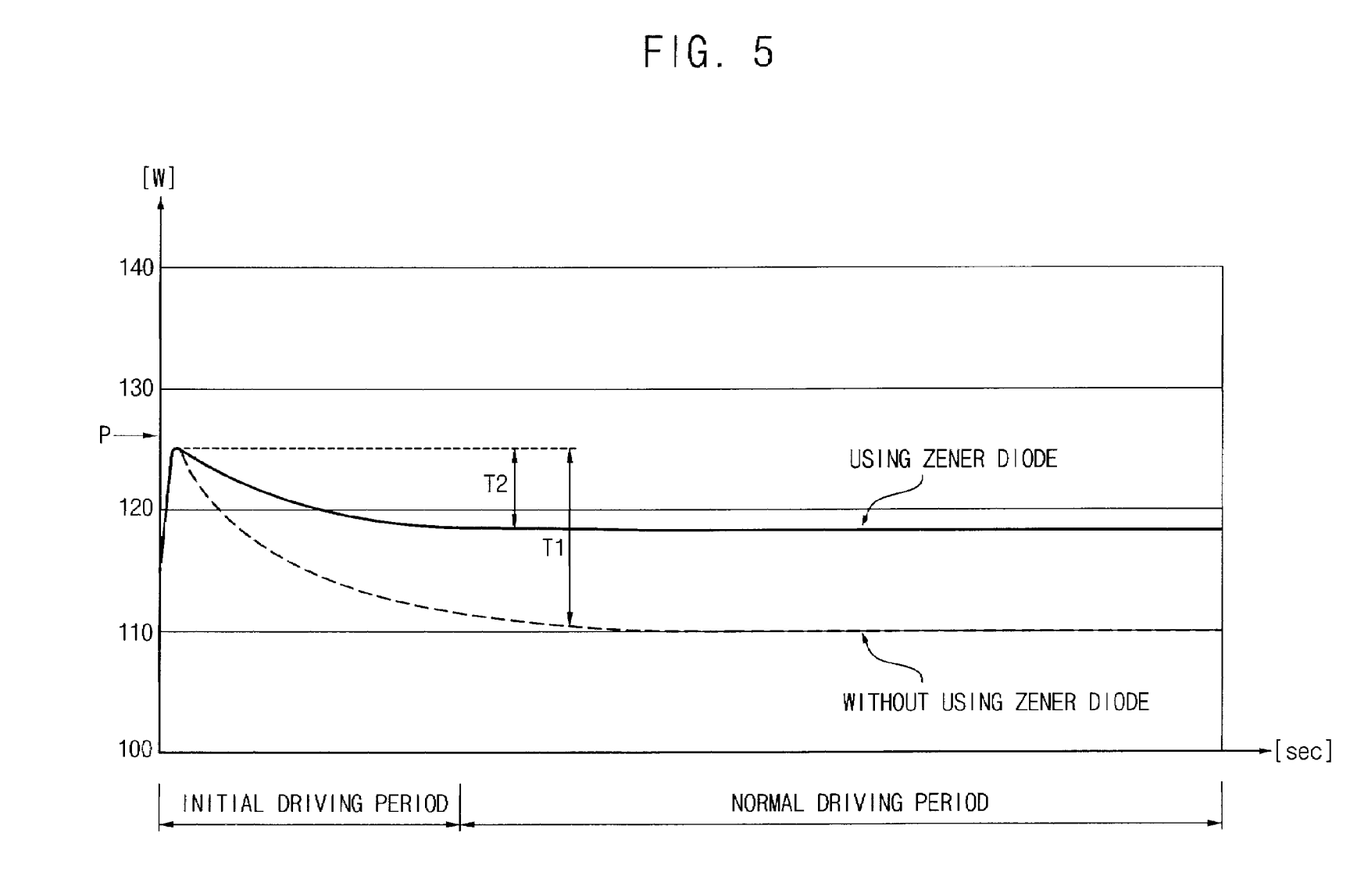
FIG. 5 is a graph illustrating another exemplary embodiment of relationships among time, power consumption of a lamp and a Zener diode in accordance with the present invention.

FIG. 5 is a graph illustrating another exemplary embodiment of relationships among time, power consumption of a lamp and a Zener diode in accordance with the present invention.

Referring to FIGS. 2 and 5, when the Zener diode is not used in the backlight assembly (e.g., portion of the curve shown in dotted lines), an initial power consumed by the lamp during an initial driving period may be greatly increased compared with a normal power consumed by the lamp during a normal driving period. That is, when the Zener diode is not used in the backlight assembly, a power overshoot may occur in the backlight assembly during the initial driving period.

When the Zener diode is used in the backlight assembly as the illustrated exemplary embodiments, the initial power is only slightly increased compared with the normal power consumed during the normal driving period. That is, a second difference T2 between the initial power and the normal power in using the Zener diode, is smaller than a first difference T1 between the initial power and the normal power in not using the Zener diode. Advantageously, when the Zener diode is used in the backlight assembly, the power overshoot does not occur during the initial driving period.

Although not intending to be bound by theory, one possible reason as shown in FIGS. 4 and 5 will be described below.

Power consumption of the lamp corresponds to the voltage applied to the feedback terminal of the main driver. Thus, when the power consumption of the lamp is increased, the voltage applied to the feedback terminal is also increased.

When the Zener diode is electrically connected to the feedback terminal of the main driver, the maximum level of the voltage applied to the feedback terminal is limited under the critical voltage. That is, when the Zener diode is electrically connected to the feedback terminal, the voltage applied to the feedback terminal is not increased over the critical voltage. Thus, the initial power of the initial driving period is not increased over the critical power P corresponding to the critical voltage.

Furthermore, when the initial power is increased over the critical power P, the voltage applied to the feedback terminal is increased over the critical voltage, the shutdown circuit of the main driver shuts down the main driver. As a result, the lamp is stopped for some time, when the main driver is shut down. Thus, the Zener diode is electrically connected to the feedback terminal, so that the main driver is not shut down.

The effects in FIGS. 4 and 5 will be described again using the reasons described above.

Referring to FIG. 4, the initial power is increased over the critical power P, when the Zener diode is not used. When the initial power is increased over the critical power, the main driver is shut down so that the driving of the lamp is stopped.

However, the initial power is not increased higher than the critical power P, when the Zener diode is used. Advantageously, the main driver is not shut down, and thus the lamp may be stably controlled.

Referring to FIG. 5, when the Zener diode is not used, the normal power is adjusted to have a sufficiently low value to prevent the initial power from increasing over the critical power P due to the overshoot state. When the normal power has the sufficiently low value, the initial power is not increased over the critical power even though the overshoot occurs in the backlight assembly.

However, the initial power is effectively or entirely prevented from being increased over the critical power P, when the Zener diode is used in the backlight assembly. Advantageously, the normal power is not increased higher than a value approximate to the critical power P.

As an advantageous result, the normal power for driving the lamp with the Zener diode may have a broader range than the normal power for driving the lamp without the Zener diode.

Figure 6:
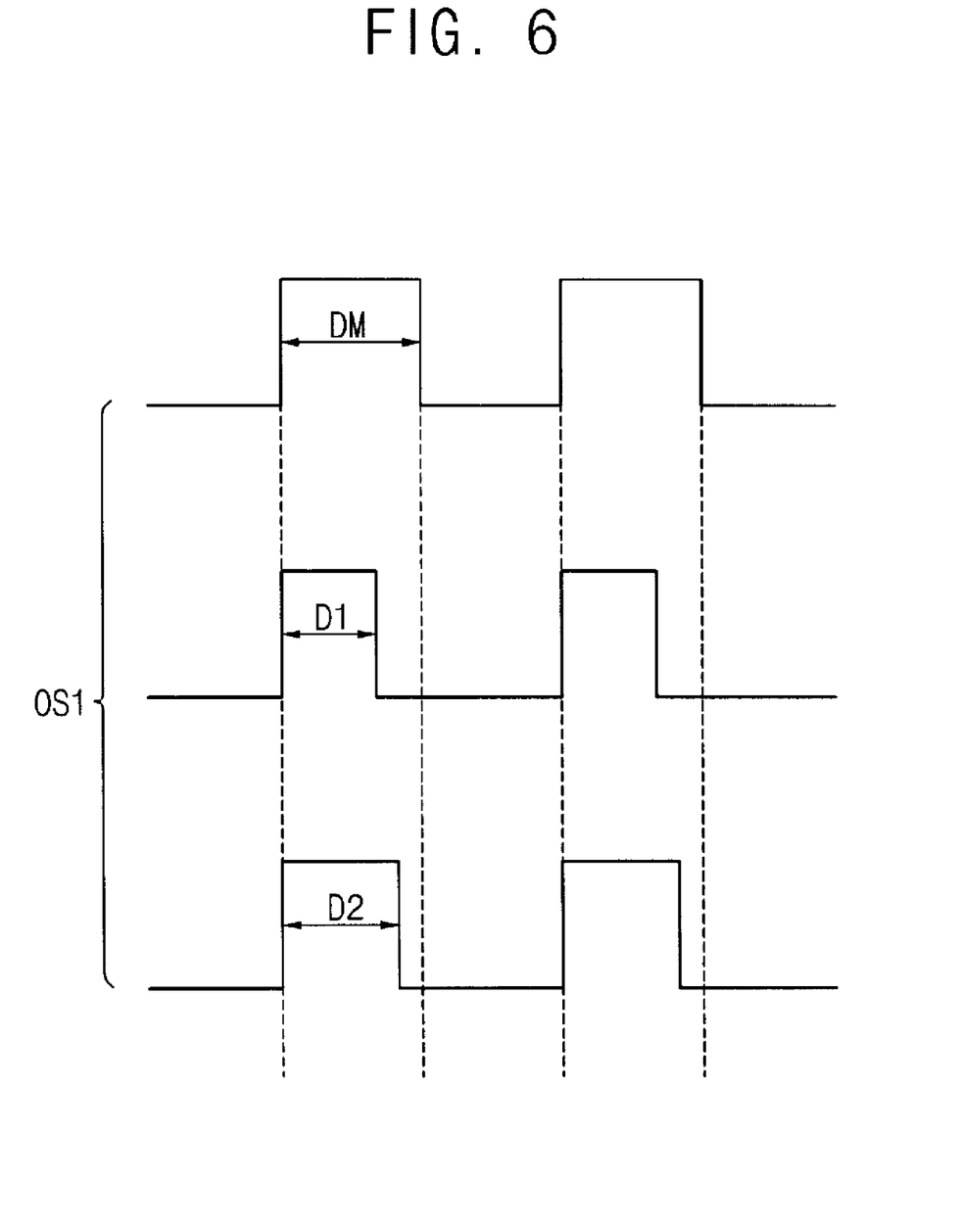
FIG. 6 is a graph illustrating an exemplary embodiment of relationships among duty widths of an output signal shown in FIG. 2.

FIG. 6 is a graph illustrating relationships among duty widths of an output signal shown in FIG. 2.

Referring to FIGS. 2 and 6, the duty width of the first and second output signals OS1 and OS2 corresponds to the voltage applies to the feedback terminal. Thus, when the duty width of the first and second output signals OS1 and OS2 is increased, the voltage applied to the feedback terminal is increased. Since the duty width of the first output signal OS1 is substantially the same as the duty width of the second output signal OS2, only the duty width of the first output signal OS1 will be described below.

When the Zener diode is used as in the illustrated embodiments, the duty width of the first output signal OS1 is not increased over a maximum duty width DM. The maximum duty width DM corresponds to the critical voltage (e.g., the maximum voltage, and the main driver is not shut down at the maximum duty width. In one exemplary embodiment, the maximum duty width DM may have a range from about 44% to about 46%, and may be preferably about 45%.

The first output signal OS1 may have a first duty width D1 or a second duty width D2 during the normal driving period. In an exemplary embodiment, the first duty width D1 is a general duty width in driving without the Zener diode, and may be about 30%. The second duty width D2 is a general duty width using the Zener diode, and may be about 40%.

The first duty width D1 needs to have a sufficient margin for reducing or effectively preventing the overshoot of the initial power, such that the first duty width D1 is smaller than the maximum duty width DM by about 15%. However, when the Zener diode is used in the backlight assembly as in the illustrated embodiments, the margin for preventing the overshoot stage of the initial power is decreased, so that the second duty width D2 is only about 5% smaller than the maximum duty width DM, such as shown in FIG. 6.

Figure 7:
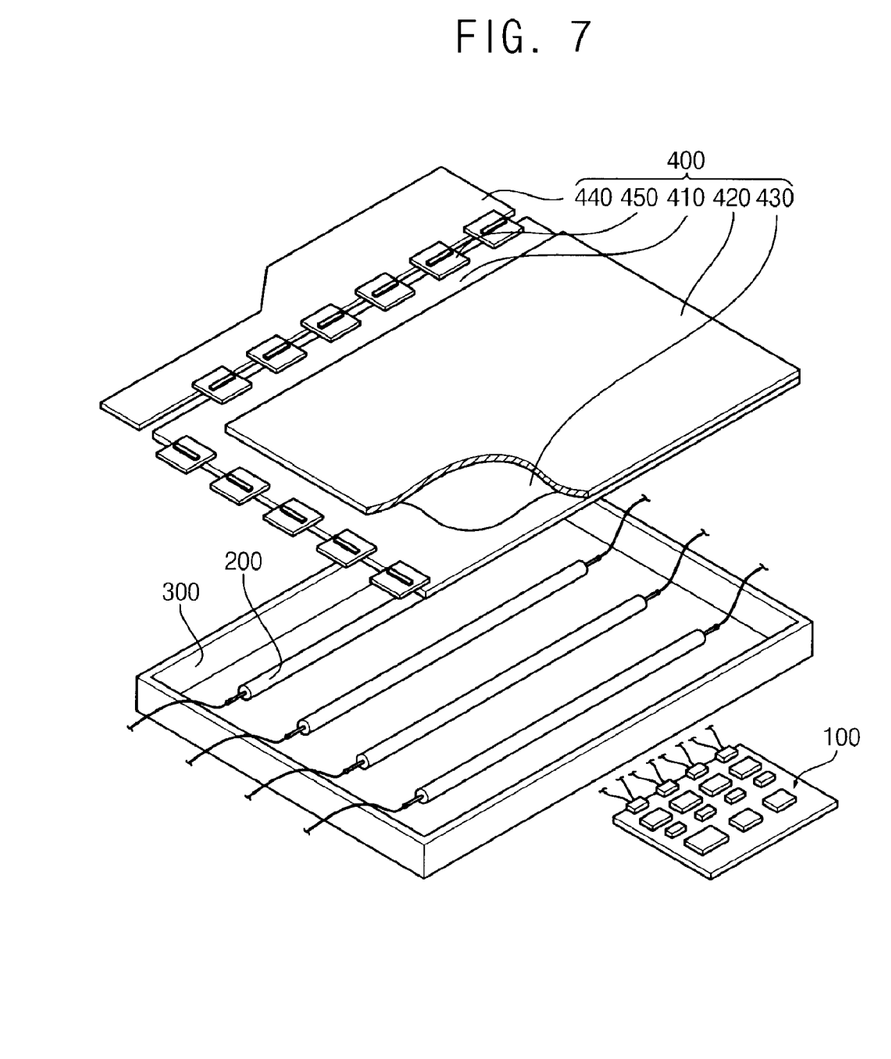
FIG. 7 is a perspective view illustrating an exemplary embodiment of a display apparatus in accordance with the present invention.

FIG. 7 is a perspective view illustrating an exemplary embodiment of a display apparatus in accordance with the present invention.

Referring to FIG. 7, a display apparatus includes a backlight assembly and a display panel 400. Since the backlight assembly in FIG. 7 is substantially the same as the backlight assembly described as FIGS. 1 and 2, detailed descriptions of the backlight assembly are omitted below.

The display panel 400 displays images using light generated from the backlight assembly. The backlight assembly may be disposed under the display panel 400, as illustrated in FIG. 7. The display panel 400 may include a first substrate 410, a second substrate 420, a liquid crystal layer 430, a printed circuit board ("PCB") 440 and a flexible PCB ("FPCB") 450.

The first substrate 410 includes a plurality of signal lines, a plurality of thin-film transistors ("TFTs") electrically connected to the signal lines, and a plurality of pixel electrodes electrically connected to the TFTs. The pixel electrodes may include an optically transparent and electrically conductive material.

The second substrate 420 is disposed opposite to the first substrate 410. The second substrate 420 includes a plurality of color filters corresponding to the pixel electrodes, respectively, and a common electrode forming on a whole of a surface of a substrate. The common electrode includes an optically transparent and electrically conductive material.

The liquid crystal layer 430 is interposed between the first and the second substrates 410 and 420. An orientation or positions of the liquid crystal layer are rearranged due to an electric field generated between the pixel electrode and the common electrode. When the liquid crystal layer 430 is rearranged due to the electric field, an optical transmittance of the display panel 400 is changed.

The PCB 440 generates a driving signal for controlling the TFTs. The FPCB 450 is electrically connected between the PCB 140 and the signal lines of the first substrate 110. The driving signal is transmitted to the signal lines of the first substrate 110 through the FPCB 450. The FPCB4150 may include a driving chip for controlling the TFTs.

As in the exemplary embodiments, since a voltage controller is connected to a feedback terminal of a main driver to control a maximum level of a voltage applied to the feedback terminal, an initial power of an inverter may be advantageously and effectively prevented from becoming a power overshoot occurring when the lamp is initially driven.

Since the voltage controller is connected to the feedback terminal, the inverter advantageously may have a normal power that is selected more freely and is under the critical power, which is the maximum power for not shutting down the main driver.

This invention has been described with reference to the exemplary embodiments. It is evident, however, that many alternative modifications and variations will be apparent to those having skill in the art in light of the foregoing description. Accordingly, the present invention embraces all such alternative modifications and variations as falling within the spirit and scope of the appended claims.

What is claimed is:

1. An inverter comprising:
   a main transformer applying a driving alternating current (AC) voltage to a lamp;
   a main driver generating an output signal and controlling the main transformer based on a feedback signal from the main transformer; and
   a voltage controller electrically connected to a feedback terminal of the main driver, and controlling a maximum level of a voltage applied to the feedback terminal to reduce a power overshoot in a driving period,
   wherein the main driver comprises a shutdown circuit shutting down the main driver when the voltage applied to the feedback terminal exceeds a critical voltage.

2. The inverter of claim 1, wherein the voltage controller comprises a Zener diode controlling the maximum level of the voltage applied to the feedback terminal.

3. The inverter of claim 1, wherein the output signal is a square wave signal.

4. The inverter of claim 3, wherein a maximum duty width of the output signal corresponding to the critical voltage has a range from about 440% to about 46%.

5. The inverter of claim 3, wherein the inverter further comprises a signal amplifier electrically connected to the main driver, receiving the output signal from the main driver, and generating an amplified signal based on the output signal.

6. The inverter of claim 5, wherein the square wave of the output signal is in a range from about 3 volts (V) to about 5 volts (V), and the square wave of the amplified signal is in a range from about 20 volts (V) to about 25 volts (V).

7. The inverter of claim 5, wherein the output signal comprises a first output signal generated from a first out terminal of the main driver, and a second output signal generated from a second out terminal of the main driver, the amplified signal comprising a first amplified signal corresponding to the first output signal, and a second amplified signal corresponding to the second output signal, and
   the signal amplifier comprises a first signal amplifier generating the first amplified signal in response to the first output signal, and a second signal amplifier generating the second amplified signal in response to the second output signal.

8. The inverter of claim 7, wherein the inverter further comprises a signal composer electrically connected to the first and second amplifiers, the signal composer receiving the first and second amplified signals from the first and second amplifiers, respectively, and generating a synthesized signal of a synthesized first and second amplified signals, wherein the synthesized signal is applied to the main transformer.

9. The inverter of claim 8, wherein the first and second amplified signals are square wave signals forming a phase delay of about 180 degrees.

10. The inverter of claim 9, wherein the synthesized signal is a square wave signal, and levels of the square wave of the synthesized signal are changed into a first voltage of positive polarity, a zero voltage, a second voltage of negative polarity and a zero voltage, in sequence.

11. The inverter of claim 1, wherein the inverter further comprises a current sensor generating a sensing current in response to a sensing AC voltage from the main transformer, and applying the sensing current to a current sensing terminal of the main driver.

12. The inverter of claim 11, wherein the current sensor is electrically connected to the feedback terminal of the main driver and applies the sensing current to the feedback terminal.

13. The inverter of claim 12, wherein the current sensor comprises a sub-transformer including a first winding coil electrically connected between a first end of the main transformer and a first end of the lamp, and a second winding coil electrically connected to the current sensing terminal of the main driver and the feedback terminal of the main driver, respectively.

14. The inverter of claim 1, wherein the inverter further comprises a voltage sensor electrically connected to a first end of the lamp, and applying a sensing voltage to a voltage sensing terminal of the main driver.

15. The inverter of claim 14, wherein the voltage sensor comprises:
 a voltage dropping circuit decreasing the driving AC voltage and generating a dropped AC voltage; and
 a rectifying circuit rectifying the dropped AC voltage and generating the sensing voltage.

16. A backlight assembly comprising:
a lamp generating light; and
an inverter comprising:
 a main transformer applying a driving AC voltage to the lamp,
 a main driver generating an output signal and controlling the main transformer based on a feedback signal from the main transformer, and
 a voltage controller electrically connected to a feedback terminal of the main driver and controlling a maximum level of a voltage applied to the feedback terminal to reduce a power overshoot in a driving period,
 wherein the main driver corn a shutdown circuit shutting down the main driver when the voltage applied to the feedback terminal exceeds a critical voltage.

17. The backlight assembly of claim 16, wherein a first end of the lamp receives the driving AC voltage, and a second end of the lamp receives a ground voltage.

18. The backlight assembly of claim 16, wherein the voltage controller comprises a Zener diode controlling the maximum level of the voltage applied to the feedback terminal.

19. A display apparatus comprising:
a display panel; and
a backlight assembly comprising:
 a lamp generating light; and
 an inverter comprising:
  a main transformer applying a driving AC voltage to the lamp;
  a main driver generating an output signal and controlling the main transformer based on a feedback signal from the main transformer; and
  a voltage controller electrically connected to a feedback terminal of the main driver and controlling a maximum level of a voltage applied to the feedback terminal to reduce a power overshoot in a driving period,
  wherein the main driver comprises a shutdown circuit shutting down the main driver when the voltage applied to the feedback terminal exceeds a critical voltage.

* * * * *